United States Patent
Orschel et al.

(10) Patent No.: US 9,330,014 B2
(45) Date of Patent: May 3, 2016

(54) METHOD AND SYSTEM FOR FULL RESOLUTION REAL-TIME DATA LOGGING

(71) Applicant: SunEdison Semiconductor Limited (UEN201334164H), St. Peters, MO (US)

(72) Inventors: Benno Orschel, Saint Louis, MO (US); Mike Wolfram, Dachwig (DE)

(73) Assignee: SunEdison Semiconductor Limited (UEN201334164H), Singapore (SG)

( * ) Notice: Subject to any disclaimer, the term of this patent is extended or adjusted under 35 U.S.C. 154(b) by 194 days.

(21) Appl. No.: 14/135,815

(22) Filed: Dec. 20, 2013

(65) Prior Publication Data

US 2014/0189273 A1    Jul. 3, 2014

Related U.S. Application Data

(60) Provisional application No. 61/747,569, filed on Dec. 31, 2012.

(51) Int. Cl.
| | |
|---|---|
| *G06F 12/10* | (2006.01) |
| *G06F 9/50* | (2006.01) |
| *G06F 12/02* | (2006.01) |
| *G06F 11/30* | (2006.01) |
| *G06F 11/34* | (2006.01) |

(52) U.S. Cl.
CPC .......... *G06F 12/1009* (2013.01); *G06F 9/5016* (2013.01); *G06F 11/3068* (2013.01); *G06F 11/3442* (2013.01); *G06F 11/3476* (2013.01); *G06F 12/0223* (2013.01)

(58) Field of Classification Search
CPC ............ G06F 11/3442; G06F 11/3476; G06F 11/3068; G06F 12/0223; G06F 9/5016
See application file for complete search history.

(56) References Cited

U.S. PATENT DOCUMENTS

| | | | |
|---|---|---|---|
| 7,058,848 B2 | 6/2006 | Sicola et al. | |
| 7,499,320 B2 | 3/2009 | Li | |
| 7,502,255 B2 | 3/2009 | Li | |
| 7,953,707 B2 | 5/2011 | Hamel et al. | |
| 7,979,546 B2 | 7/2011 | Hamel et al. | |
| 8,041,897 B2 | 10/2011 | Biles et al. | |
| 8,627,000 B2 | 1/2014 | Green et al. | |
| 8,935,514 B2 | 1/2015 | Falik et al. | |
| 2003/0163589 A1* | 8/2003 | Bunce .................. | H04L 49/1546 709/250 |
| 2003/0188229 A1* | 10/2003 | Lubbers .............. | G06F 11/2064 714/47.2 |
| 2007/0136402 A1* | 6/2007 | Grose .................. | G06F 12/0253 |
| 2008/0168308 A1* | 7/2008 | Eberbach .............. | G06F 11/008 714/26 |
| 2011/0313973 A1 | 12/2011 | Srivas et al. | |

FOREIGN PATENT DOCUMENTS

JP         2001-02633  A1  *  1/2001

OTHER PUBLICATIONS

Machine Translation of JP 2001-02633.*

* cited by examiner

*Primary Examiner* — Edward Dudek, Jr.
(74) *Attorney, Agent, or Firm* — Armstrong Teasdale LLP

(57) ABSTRACT

A method and data-logging system are provided. The system includes a map-ahead thread configured to acquire blocks of private memory for storing data to be logged, the blocks of private memory being twice as large as the file page size, a master thread configured to write data to the blocks of private memory, in real-time and in full resolution, the data acquired during operation of a machine generating the data and written to the blocks of private memory in real-time, the machine including a controller including a processor communicatively coupled to a memory having processor instructions therein, and a write-behind thread configured to acquire pages of memory that are mapped to pages in a file, copy the data from the blocks of private memory to the acquired file-mapped blocks of memory.

18 Claims, 8 Drawing Sheets

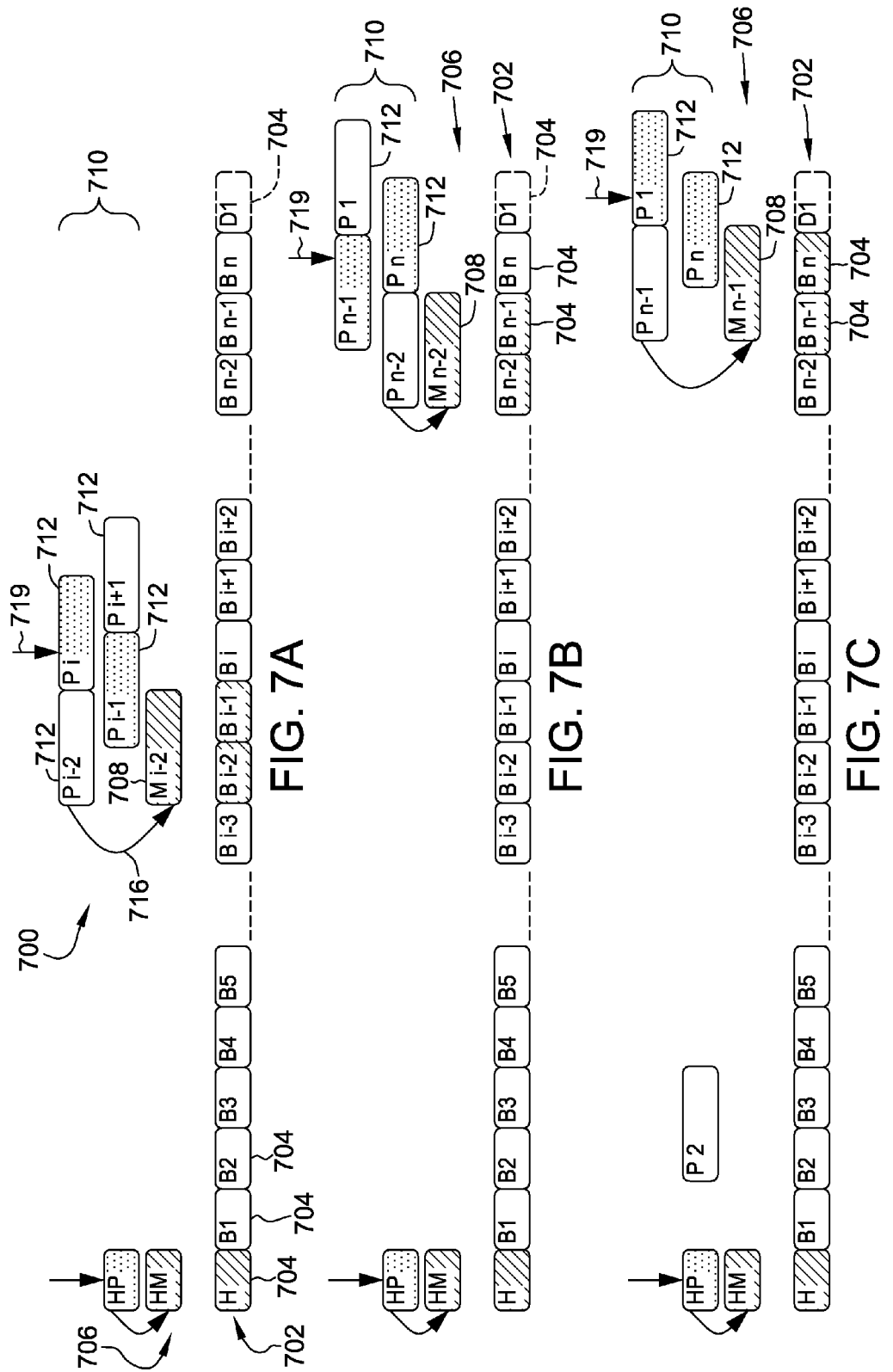

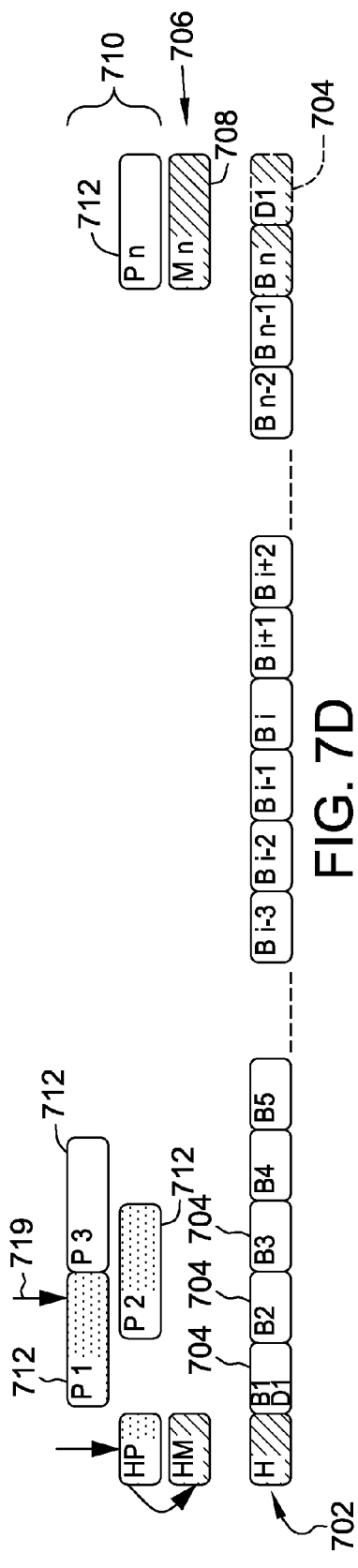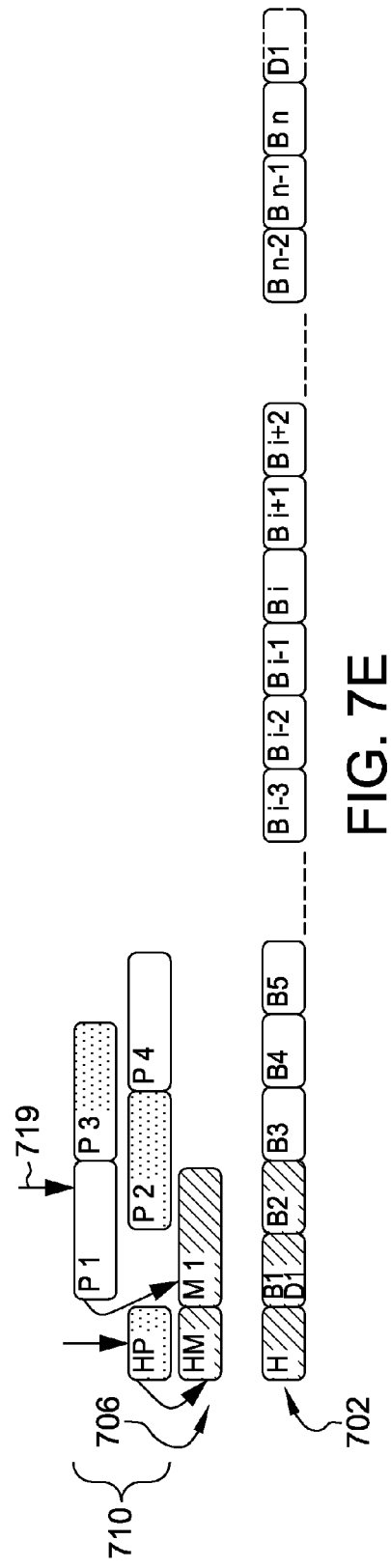

METHOD AND SYSTEM FOR FULL RESOLUTION REAL-TIME DATA LOGGING

CROSS REFERENCE TO RELATED APPLICATIONS

This application claims priority to and the benefit of the filing date of U.S. Provisional Application No. 61/747,569 filed on Dec. 31, 2012, which is hereby incorporated by reference in its entirety.

BACKGROUND

The field of the disclosure relates generally to computerized control of machines, and more particularly to computerized coordination of multiple operations to be performed by components of machines.

Complex machines, such as those found in a silicon wafer manufacturing plant or other industrial plant, often include multiple components whose operations must be precisely orchestrated to produce a product properly. Often, not only must the multiple components of a given machine work in concert, interactions between different machines must be coordinated as well. The components can include valves, motors, heaters, fans, and sensors, to name a few. To properly make a product pursuant to certain specifications set by an engineer, raw materials might undergo a multitude of processes as they transition into an intermediate product and finally a finished product. The processes might involve, for example, heating silicon in a crucible, extracting the silicon from the crucible at a specific rate and temperature to form a crystal, and partitioning the crystal into wafers. Other processes might include vapor deposition and etching of a wafer of silicon. In other industrial plants, similarly complex processes are carried out.

Recording all of these operations in real-time and in full resolution requires is difficult because of the many demands placed on the machine computing resources. If occasional software hang-ups cause data to be missed, critical information for post event analysis may not be able to be recovered or duplicated.

BRIEF DESCRIPTION

In one aspect, a data-logging system includes a map-ahead thread configured to acquire blocks of private memory for storing data to be logged, the blocks of private memory being twice as large as the file page size, a master thread configured to write data to the blocks of private memory, in real-time and in full resolution, the data acquired during operation of a machine generating the data and written to the blocks of private memory in real-time, the machine including a controller including a processor communicatively coupled to a memory having processor instructions therein, and a write-behind thread configured to acquire pages of memory that are mapped to pages in a file, copy the data from the blocks of private memory to the acquired file-mapped blocks of memory.

In another aspect, a method of data-logging, includes mapping blocks of private memory to a time index for storing data to be logged in time, the blocks of private memory being twice as large as a page size of the blocks of private memory to which the data will be stored, the blocks of private memory reserved to a data-logging process and writing data to the blocks of private memory, in real-time and in full resolution, the data acquired during operation of a machine generating the data and written to the blocks of private memory in real-time, the machine including a controller including a processor communicatively coupled to a memory having processor instructions therein. The method also includes acquiring blocks of memory that are mapped to pages in a file, copying, by the data-logging process, the data from the blocks of private memory to the acquired file-mapped blocks of memory, and automatically synchronizing the data on the storage device to the contents of the file-mapped blocks of memory by an operating system controlling the operation of the machine.

In another aspect, one or more non-transitory computer-readable storage media has computer-executable instructions embodied thereon, wherein when executed by at least one processor, the computer-executable instructions cause the processor to at a request of a write behind thread, map pages of a file to blocks of memory for storing data to be logged in the file, the mapped blocks of memory sized to be twice the size of native pages of an operating system of the processor. The computer-executable instructions cause the processor to at the request of a map ahead thread, reserve a plurality of blocks of private memory sized to be twice the size of the native pages and each overlapping with respect to adjacent blocks of private memory, acquire data from a plurality of sensors during operation of a machine generating the data, store the acquired data in the blocks of private memory in real-time, and copy the data from the blocks of private memory to the file-mapped blocks of memory.

DRAWINGS

FIG. 1 is a diagram of a crystal puller, which may be controlled by a control server in accordance with an embodiment of the present disclosure.

FIG. 2 is a diagram of components included in an epitaxial reactor, which may be controlled by a control server in accordance with an embodiment of the present disclosure.

FIG. 3 is a block diagram of a plurality of machines having a plurality of components communicatively coupled to a control server in accordance with an exemplary embodiment of the present disclosure.

FIG. 4 is a block diagram of a system for controlling components of a machine, in accordance with an embodiment of the present disclosure.

FIG. 5 illustrates a configuration of a computing device in accordance with an exemplary embodiment of the present disclosure.

FIG. 6 is a schematic block diagram of a data-logging system 600 in accordance with an exemplary embodiment of the present disclosure.

FIG. 7A is a file and memory map of data collected by the system shown in FIG. 4.

FIG. 7B illustrates the data logging process at the end of the file being written to the storage device.

FIG. 7C illustrates the data logging process when data is being written to private pages $P_1$ and $P_n$.

FIG. 7D illustrates the data logging process when data written at the end of the file to memory page $P_n$ is copied into file-mapped memory location $M_n$ and logging has progressed to writing data to pages $P_1$ and $P_2$.

FIG. 7E illustrates the data logging process when the index reaches the end of page $P_1$.

DETAILED DESCRIPTION

Figure 1:
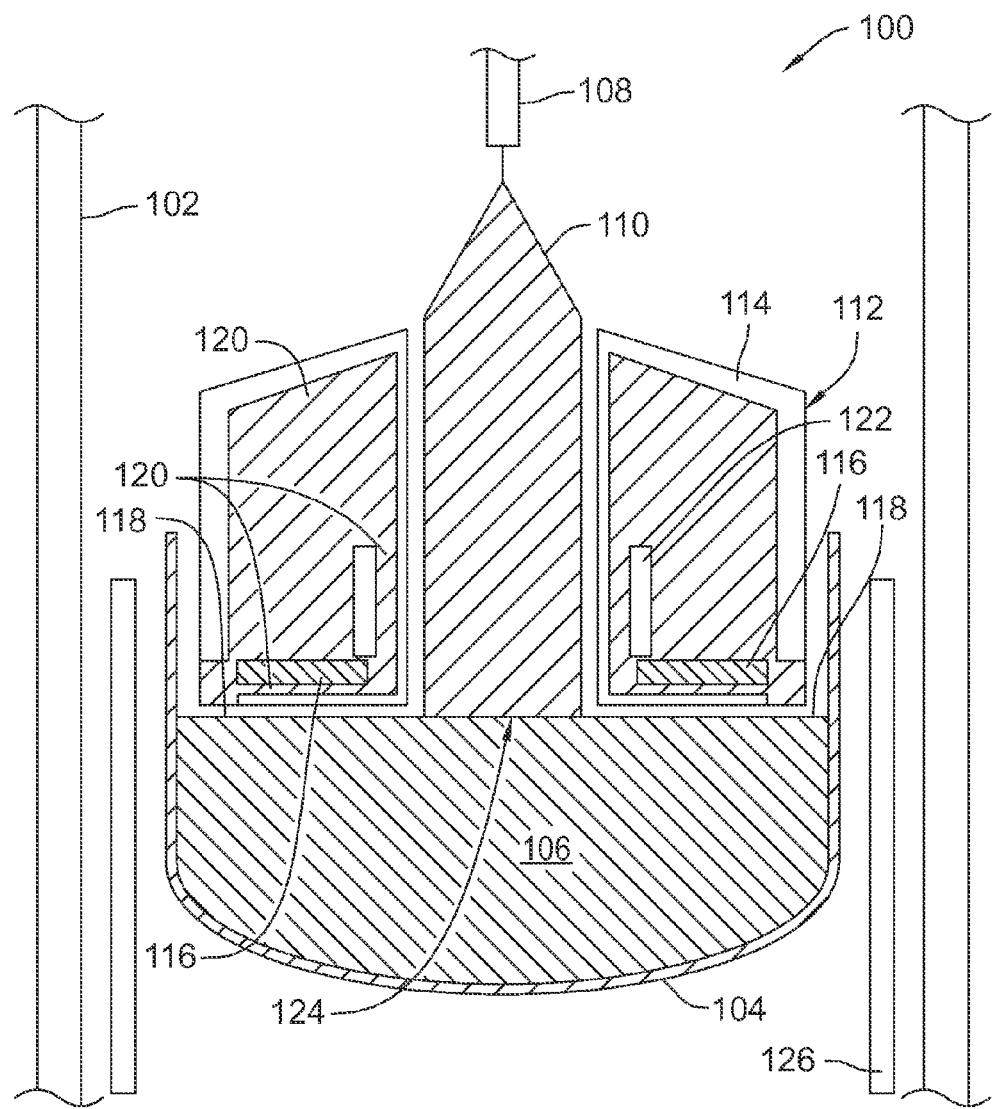
FIGS. 1-6 show exemplary embodiments of the method and apparatus described herein.

The following detailed description illustrates embodiments of the disclosure by way of example and not by way of limitation. It is contemplated that the disclosure has general application to analytical and methodical embodiments of reliable high speed data-logging in industrial, commercial, and residential applications.

Numerical data logging is widely used throughout all kinds of control applications. However, even on widely used Real-Time Operating Systems (QNX, VxWorks, and Linux with Real-Time Patched Kernel) continuous logging of real time data at full resolution is not possible if the real time cycles are in the order of tens of milliseconds. Unfortunately, most real time applications require cycle times of less than 100 milliseconds, but the operating system disk I/O is not deterministic at that level. Even memory mapping of file pages is not helpful, as the timing of write access to the file-mapped file pages is not deterministic as well. Another problem is that writing to files continuously would cause any continuously running log to exceed the hard disk capacity over time.

Embodiments of a real-time data logging process executed in conjunction with an operating system of processor-controlled machines. In the example embodiment, the machine is a crystal puller or a reactor used to form ingots of semiconductor material or alter semiconductor wafers to form circuits on wafers of the ingots. The data logging process receives sensed or calculated parameters from sensors on the machines. The data logging process also receives state information that defines the current state of the machines and alarm and warning information for generation of displays and interlock commands.

The data logging process includes a cyclic file of constant size, which holds enough data for a predetermined length of time and is index-based, using an index per real time cycle. As used herein, private memory refers to memory that a process has reserved for its own use from the operating system. Private memory is not managed by the operating system until it is released back to the operating system by the process. An example of private memory is memory that is not mapped to a file. Super pages refers to blocks of memory that are at least twice the size of native blocks of memory. As used herein, super pages are overlapped to provide a continuously accessible amount of historical data that is equivalent to at least one block of native memory. Unless previously used private super pages have become ready for re-use, a map ahead thread, having high priority, acquires private (non-file-mapped) super pages of at least two native pages, for overlapping and locks them so they cannot be swapped out by the operating system. These pages are used by real-time threads, writing data at full resolution with increasing index. A write behind thread of medium priority maps file pages into RAM and copies the data from the private pages. The write behind thread also marks out of scope private pages as ready for re-use by the map-ahead thread. The super pages are overlapping, to guarantee a predetermined amount of historical data is always accessible in the private pages, guaranteeing true real time read access by threads performing some form of data analysis in sync with the real time I/O.

The data logging process writes the values for the sensed and calculated parameters to a block of memory reserved from the machine operating system. The memory is private and overlapping, meaning memory locations of a last portion of a first block of memory is written simultaneously with memory locations of a first portion of a second block of memory. Each data element is written to two memory locations in different memory blocks that are overlapping with respect to each other and other adjacent memory blocks. Overlapping of the private memory blocks permits maintaining a sufficient history of the written data in memory for processing a predetermined amount of historical data to compute, for example, Fourier and Laplace transforms of the data.

Using private memory reserved to the data logging process permits real-time logging of the data without the possibility of the data logging being delayed by resource demands made on the processor by other processes running simultaneously with the data logging process.

When data logging to the memory locations in each block of private memory is complete (i.e., every memory location in the block has been written to), that block becomes inactive (data is no longer being written to it) and is readied for copying its contents to a respective file-mapped memory block. The memory blocks are mapped to pages of a file that will store the historical values of the parameters for a relatively long period of time. The operating system is in control of copying the data from the file-mapped memory blocks to the respective file pages. Because of requirements for real-time data logging and real-time historical accessibility, the private and file-mapped memory blocks are predetermined to be twice the size of the file page size dictated by the operating system. For example, many operating systems manage files to be formed of pages holding approximately four kilobytes (kb) of data. Accordingly, in such a case, the private and file-mapped memory blocks would be sized to hold approximately eight kb.

The data logging file is overwritten when the amount of data being stored exceeds the predetermined storage limits for the file. To ensure that all data is logged in real-time and that a full block of historical data is available in real-time, a duplicate file page is written at the end of the file. This duplicate page is a placeholder for data being written from the file-mapped memory block to the last file page. Because the last file page is only half the size of the mapped memory block it is being written from, the duplicate block is necessary, otherwise the operating system would block the copy process as the destination (the single file page) would not be large enough to receive the data from the mapped memory block (because it is twice as large). By writing to the last page of the file and to the duplicate page, the process of writing the mapped memory block to the file is able to be completed and the operating system will not flag an exception.

The data logging process writes real-time data to a cyclically overwritten storage file by first writing the data to overlapping private memory blocks, copying the data from the overlapping private memory blocks to file-mapped memory blocks that are copied by the operating system to the storage file.

As used herein, real-time refers to outcomes occurring at a substantially short time period after a change in the inputs affecting the outcome, for example, receiving machine operating parameter data and writing the data to a memory at a rate that permits high resolution and high fidelity of the data stored. The period is the amount of time between each iteration of a regularly repeated task or between one task and another. The time period is a result of design parameters of the real-time system that may be selected based on the importance of the outcome and/or the capability of the system implementing processing of the inputs to generate the outcome. Additionally, events occurring in real-time occur without substantial intentional delay.

FIG. 1 is a diagram of a crystal puller 100, which may be controlled by a control server in accordance with an embodiment of the present disclosure. Crystal puller 100 is used to grow monocrystalline ingots according to the Czochralski method. The Czochralski method is known to those skilled in the art of forming monocrystalline ingots. Crystal puller 100 includes a housing 102, and a quartz crucible 104 in the housing 102 for containing a semiconductor melt 106. The melt contains, for example, silicon. A pulling mechanism 108, such as a shaft or pull wire, secured in housing 102 and adapted to extend toward crucible 104, is adapted to continuously pull a solid monocrystalline ingot or crystal 110 from melt 106. A tubular graphite reflector 112 secured in a growth chamber of housing 102 includes a cover 114 preferably made of graphite and having a central opening sized and shaped for surrounding the growing crystal 110. An annular melt heat exchanger 116 is mounted within cover 114 to face the exposed melt surface 118.

Melt heat exchanger 116 includes a heat source such as an electrically-powered heater. Melt heat exchanger 116 may also include a heat absorption structure. Insulation 120 is disposed between melt heat exchanger 116 and melt surface 118 to inhibit heat transfer between melt surface 118 and melt heat exchanger 116. A crystal heat exchanger 122 is also mounted within cover 114 to surround and to face the growing crystal 110. Crystal heat exchanger 122 is disposed above melt heat exchanger 116 as close to the melt/crystal interface 124 as practical, such that crystal heat exchanger 122 cools a segment of crystal 110 proximate the interface 124. Crystal heat exchanger 122 is cooled by conventional cooling fluid, for example, water. Crystal heat exchanger 122 also includes a heater for controlling the temperature of the cooling fluid. Additionally, a side heater 126 is located adjacent crucible 104 for heating crucible 104. A control server in accordance with embodiments of the present disclosure may be used to set temperatures of melt heat exchanger 116, crystal heat exchanger 122, and side heater 126. Further, a control server in accordance with embodiments of the present disclosure may control the rate at which pull mechanism 108 pulls crystal 110 from melt 106.

Figure 2:
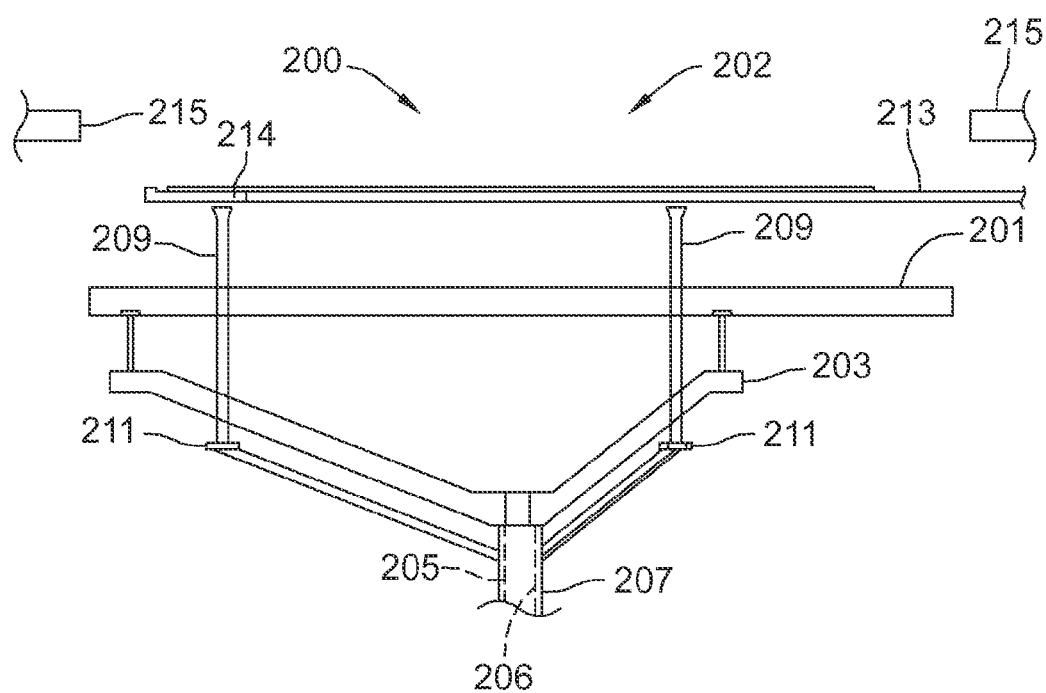

FIG. 2 is a diagram of components included in an epitaxial reactor 200, which may be controlled by a control server in accordance with an embodiment of the present disclosure. A positioning mechanism 202 within the epitaxial reactor 200 operates to position a silicon wafer during various phases of a chemical vapor deposition processes within a chamber of the epitaxial reactor 200. The wafer may be supported by a susceptor 201. Susceptor 201 is mounted on arms 203, which, in turn, are mounted to a susceptor support shaft 205. Susceptor support shaft 205 is slidingly mounted within a bore 206 of a wafer lift shaft 207. A pneumatic mechanism (not shown) is operable to raise and lower susceptor support shaft 205 and wafer lift shaft 207 to various positions. The pneumatic mechanism (not shown) may also rotate susceptor 201. Rigid pins 209 are slidingly mounted to susceptor 201 and, when not elevated by susceptor 201, are supported by stops 211 of wafer lift shaft 207. Rigid pins 209 may support the wafer when brought into contact with the wafer.

During an exchange phase, a blade 213 carries the wafer into position above pins 209. Subsequently, wafer lift shaft 207 elevates, causing pins 209 to translate upwards and support the wafer. Blade 213 includes a notch 214 to allow room for one of pins 209 that would otherwise collide with blade 213. Once the wafer is supported by pins 209, blade 213 is withdrawn from the reactor 200. Next, susceptor support shaft 205 elevates, causing susceptor 201 to move upwards and come into contact with the wafer. Thereafter, the wafer is supported by susceptor 201. Susceptor support shaft 205 continues to elevate until susceptor 201 and the wafer are level with ring 215. At this point, the wafer and susceptor 201 are in the "process" position. When in the process position, susceptor 201 rotates as heat lamps (not shown) within epitaxial reactor 200 heat the wafer. Additionally, valves (not shown) are opened and closed to release various gases at precise temperatures, pressures, and times. For example, the wafer may undergo a pretreatment process during which a silicon oxide layer is removed from the surface of the wafer.

During the pretreatment process, the epitaxial reactor 200 heats the wafer, using heat lamps (not shown) to 1150 to 1220° C. The heat lamps are controlled to raise the temperature at 3 to about 18° C. per second. Then the chamber of the epitaxial reactor 200 is filled with $H_2$ and the wafer is annealed for 10 to 15 seconds. Next, an epitaxial layer is deposited on the wafer. The chamber of the epitaxial reactor 200 is filled a carrier gas, such as $H_2$, and a silicon-containing gas, for example, $SiHCL_3$, at atmospheric pressure. The wafer surface is maintained at a temperature of at least 900° C. during this process. After a predetermined time, the silicon-containing gas is purged with, for example, $H_2$. The wafer is then heated further, for a predetermined duration, for example 10 seconds. Next the wafer is cooled at a rate of 50° C. per second until it reaches 800° C. During this cooling process, susceptor 201 is lowered such that the wafer is supported only by pins 209. As is apparent, the above-described processes require a plurality of components of epitaxial reactor 200 to be precisely coordinated in order for the process to be carried out correctly.

Figure 3:
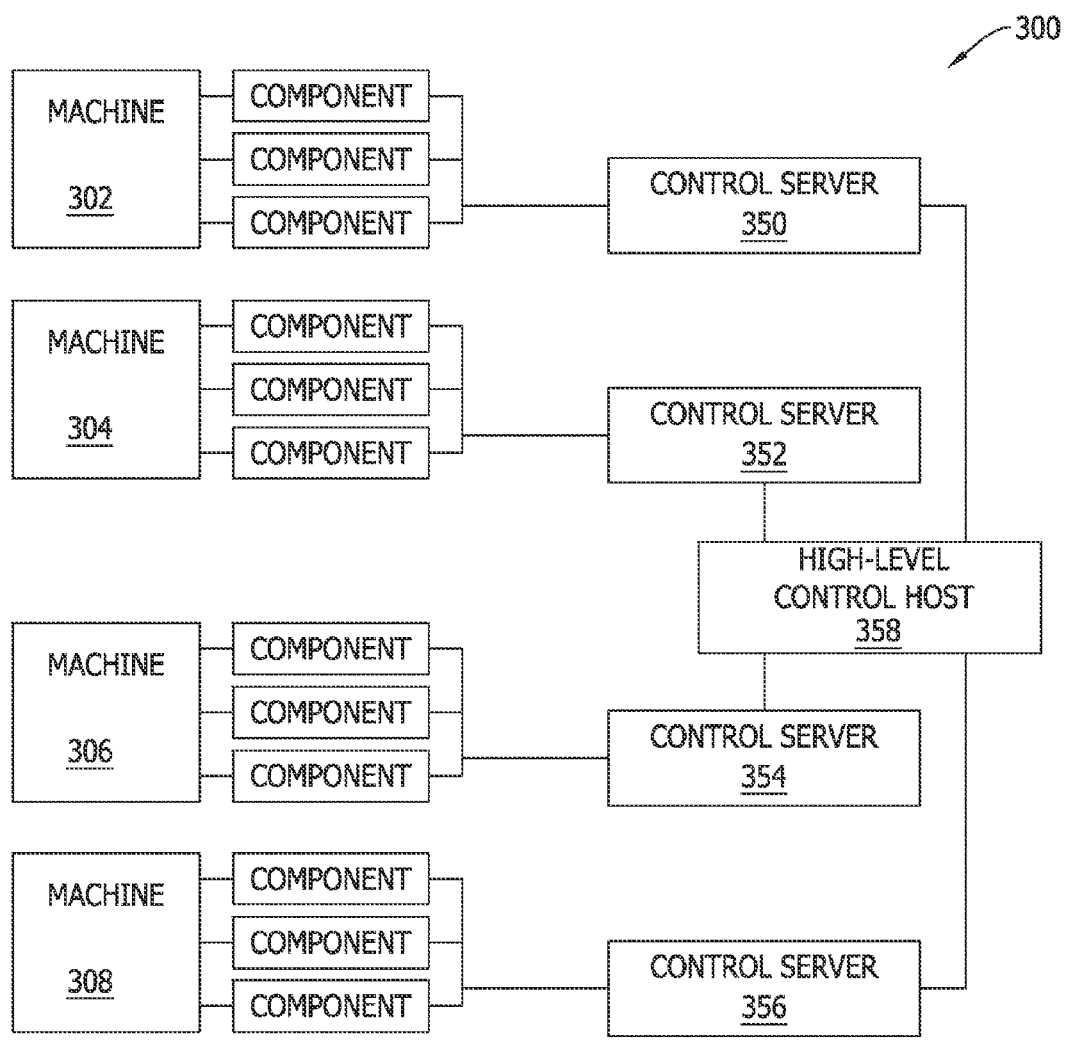

FIG. 3 is a block diagram 300 of a plurality of machines 302, 304, 306, and 308 having a plurality of components 310, 312, 314, 316, 318, 320, 322, 324, 326, 328, 330, and 332 communicatively coupled to a control server 350 in accordance with an exemplary embodiment of the present disclosure. Machine 302, is for example, a crystal puller and machines 304, 306, and 308 are, for example, epitaxial reactors. In the exemplary embodiment, machines 302, 304, 306, and 308 are used in the generation of silicon wafers in a silicon wafer manufacturing plant. However, those skilled in the art will appreciate that the methods and systems disclosed herein are equally applicable to other processes and other environments, and that the number of machines may vary.

Communicatively coupled to machine 302, which is a crystal puller, are components 314, 316, and 318. Component 314 is a pulling mechanism similar to pulling mechanism 108 (FIG. 1), component 316 is a melt heat exchanger, similar to melt heat exchanger 116 (FIG. 1), and component 318 is a crystal heat exchanger, similar to crystal heat exchanger 122 (FIG. 1). Machines 304, 306, and 308 are epitaxial reactors, similar to epitaxial reactor 200 (FIG. 2). Components 316, 322, and 328 are susceptor support shafts, similar to susceptor support shaft 205 (FIG. 2). Components 318, 324, and 330 are wafer lift shafts, similar to wafer lift shaft 207 (FIG. 2). Components 320, 326, and 332 are gas valves, similar to those discussed with reference to epitaxial reactor 200 (FIG. 2). FIG. 3 is a simplified representation of machines and associated components, and, as is evident from the discussion of crystal puller 100 and epitaxial reactor 200, additional components, including pneumatic mechanisms, heaters, temperature sensors, and pressure sensors are also included as components of one or more of the machines.

A first control server 350 is communicatively coupled to components 310, 312, and 314 of machine 302. A second control server 352 is communicatively coupled to components 316, 318, and 320 of machine 304. A third control server 354 is communicatively coupled to components 322, 324, and 326 of machine 306. A fourth control server 356 is communicatively coupled to components 328, 330, and 332 of machine 308. A high level control host 358 monitors and issues high-level instructions to each of control servers 350, 352, 354, and 356. Control server 350 issues instructions to and receives information from components 310, 312, and 314. For example, control server 350 may instruct component 312, which is a melt heat exchanger, to reach a target temperature. Another component, which is a temperature sensor, provides temperature information to control server 350. Control server 350 also instructs crystal heat exchanger, which is component 314, to reach a target temperature. Another component, which is a temperature sensor for the crystal heat exchanger, provides temperature information to control server 350. Once the target temperature of the melt heat exchanger (component 312) and crystal heat exchanger (component 314) reach their target temperatures, control server 350 instructs puller mechanism to lower a crystal into the melt and begin pulling the crystal out of the melt at a particular rate. Control servers 352, 354, and 356 may simultaneously be issuing instructions and receiving sensor information from epitaxial reactors (machines 304, 306, and 308) to carry out loading of silicon wafers, removal of silicon oxide from the silicon wafers, epitaxial deposition onto the silicon wafers, heating and cooling of the silicon wafers, and/or unloading of the silicon wafers. High level control host 358 may monitor the status of each of control servers 350, 352, 354, and 356, issue high-level commands such as shutting down or starting up any of control servers 350, 352, 354, and 356 and logging any errors.

Figure 4:
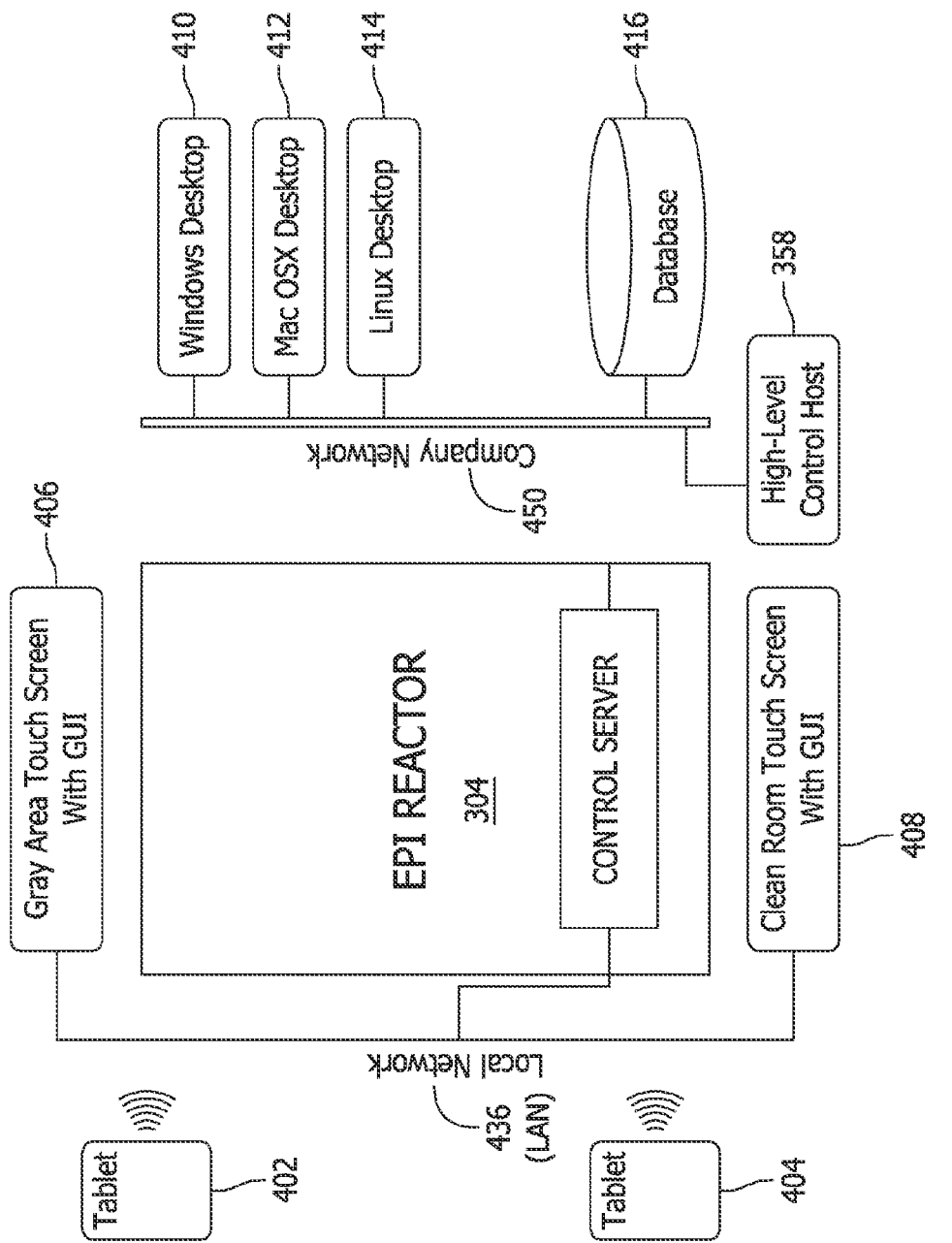

FIG. 4 is a block diagram of a system 400 for controlling components of a machine, in accordance with an embodiment of the present disclosure. Components in system 400, identical to components of system 300 (shown in FIG. 3), are identified in FIG. 4 using the same reference numerals used in FIG. 4. System 400 includes control server 352 and machine 304, which is an epitaxial reactor. A disk storage unit containing database 416 company network 450, which may be, for example, a wide area network (WAN). In some embodiments, company network 450 may be accessible through an Internet connection. System also includes a local area network (LAN) 436. Client devices 402 and 404, which are both tablet computing devices, are communicatively coupled to LAN 436 through wireless network connections. Client devices 406 and 408 are physically coupled to LAN 436 through wired connections. Also coupled to LAN 436 is control server 352. Control 352 is communicatively coupled to machine 304, which is an epitaxial reactor, as explained above. Each of client devices 402, 404, 406, and 408 is configured to interact with control server 352 using a user interface, such as a graphical user interface (GUI). Client devices 410, 412, and 414 are also communicatively coupled to control server 352 through company network 450. Client device 410 may be executing a Windows operating system. Client device 412 may be operating, for example, an OS X operating system. Moreover, client device 414 may be operating, for example, a Linux operating system. That is, each of client devices 410, 412, and 414 are able to communicate with control server 352 regardless of the operating system running on the client device. Client devices 402, 404, 406, 408, 410, 412, and 414 may issue instructions to control server 352, such as information regarding processes and steps in the processes ("recipes") for producing products using machine 304 and for receiving status information regarding machine 304 and the components thereof. Database 416 is coupled to company network 450 and may store settings, logs, and other data to enable system 400 to operate as described herein.

In some embodiments, rather than communicating directly with control server 352, one or more of client devices 402, 404, 406, 408, 410, 412, and 416 may communicate with high-level control host 358 (FIG. 3). By communicating with high-level control host 358, rather than directly communicating with control server 352, instructions may be submitted to another control server, for example 350, 354, or 356, depending on the current capacity of each of control servers 350, 352, 354, and 356, as determined by high-level control host 358.

Figure 5:
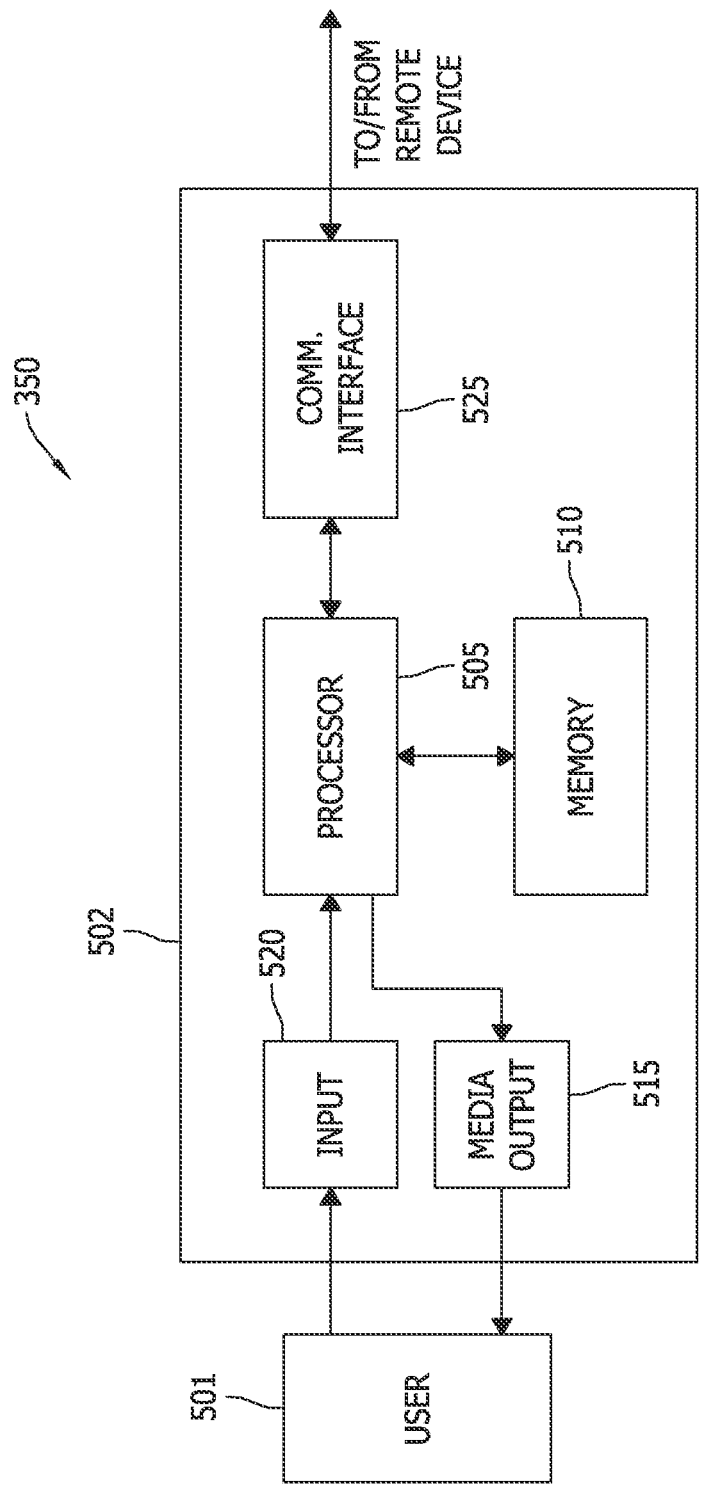

FIG. 5 illustrates a configuration of a computing device 502 in accordance with an exemplary embodiment of the present disclosure. For example, computing device 502 is representative of any of control servers 350, 352, 354, 356, high-level control host 358, and of any of client devices 402, 404, 406, 408, 410, 412, and 414. Computing device 502 includes a processor 505 for executing instructions. In some embodiments, executable instructions are stored in a memory area 510. Processor 505 may include one or more processing units (e.g., in a multi-core configuration). Memory area 510 is any device allowing information such as executable instructions and/or data to be stored and retrieved. Memory area 510 may include one or more computer readable storage device or other computer readable media, including transitory and non-transitory computer readable media.

Computing device 502 also includes at least one media output component 515 for presenting information to user 501. Media output component 515 is any component capable of conveying information to user 501. In some embodiments, media output component 515 includes an output adapter such as a video adapter and/or an audio adapter. An output adapter is operatively coupled to processor 505 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, at least one such display device and/or audio device is included in media output component 515.

In some embodiments, computing device 502 includes an input device 520 for receiving input from user 501. Input device 520 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 515 and input device 520.

Computing device 502 may also include a communication interface 525, which is communicatively couplable to a remote computing device such as any of control servers 350, 352, 354, 356, high-level control host 358, and client devices 402, 404, 406, 408, 410, 412, and 414. Communication interface 525 of control servers 350, 352, 354, and 356 are additionally coupled to components of machines 302, 304, 306, and 308 as described above. Communication interface 525 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 510 are, for example, processor-executable instructions for providing a user interface to user 501 via media output component 515 and, optionally, receiving and processing input from input device 520. A user interface may include, among other possibilities, a web browser and client application. Web browsers enable users, such as user 501, to display and interact with media and other information typically embedded on a web page or a website from a server system. A client application allows a user, such as user 501, to display and interact with a server system, such as control server 352, in a manner that does not necessarily involve a web page or website and which may offload more storage and/or processing functions to the client application from the server system.

Memory area 510 may include, but is not limited to, any computer-operated hardware suitable for storing and/or retrieving processor-executable instructions and/or data. Memory area 510 may include random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). Further, memory area 510 may include multiple storage units such as hard disks or solid state disks in a redundant array of inexpensive disks (RAID) configuration. Memory area 510 may include a storage area network (SAN) and/or a network attached storage (NAS) system. In some embodiments, memory area 510 includes memory that is integrated in computing device 502. For example, computing device 502 may include one or more hard disk drives as memory 510. Memory area 510 may also include memory that is external to computing device 502 and may be accessed by a plurality of computing devices 502. The above memory types are exemplary only, and are thus not limiting as to the types of memory usable for storage of processor-executable instructions and/or data.

Control server 350 contains, within memory area 510, processor-executable instructions for executing multiple threads for controlling components of machine 302. Each thread may cause control server 350 to issue instructions to machine 302 for a series of steps (again, a "recipe") for generating a product. The threads executing in control server 350 interact with the components of machine 302 through control objects, embodied in processor-executable instructions in the memory area 510 of control server 350. The control objects are configured and managed in a particular manner that prevents multiple threads from simultaneously accessing and issuing conflicting instructions to a component of a machine 302 and/or causing race conditions or deadlocks, as known in the art of multithreaded processing. The same is true of control servers 352, 354, and 356 and respective machines 304, 306, and 308.

In this description, "lock" or "locking" means preventing memory pages from being swapped to hard disk by the operating system. Further "mapping" a memory page means mapping its content to a time range which is addressed by an index that is calculated by current time date divided by the interval of the real-time sampling. A "mapped" page may or may not be file-mapped at the same time. "Overlapping" memory blocks or pages, in this description, means memory blocks or pages that are mapped to overlapping time ranges, whereas the address spaces (actual memory locations) of the "overlapping" blocks or pages can be arbitrary and independent. "File-mapping" means that the content of the memory block is linked to a block of data in a file which the operating system keeps in synch with the content of the memory block. Modifying the content of a file-mapped memory block may be delayed occasionally due to hard disk performance and other applications also trying to use the hard disk. On the other hand, a private memory block means that this memory is not linked to a data block in a file. Modifying a private memory block always happens immediately, without delays because no file needs to be updated simultaneously.

Further, it should be understood that, in exemplary embodiments of the present disclosure, multiple copies or instances of group representative objects, control objects, and groups of control objects represented by group representative objects will typically exist in memory area 510 of control server 350 at any given time. Further, and as will be appreciated by those skilled in the art of computer programming, the functions, also known as "member functions", of a group representative object are executed from the perspective the group representative object. Likewise, functions or "member functions" of a control object are executed from the perspective of the control object. It will also be appreciated by those skilled in the art that, while an object-oriented model is used to describe the processor-executable instructions carried out by control server 350, the processor-executable instructions could be organized in any other form, for example a functional-oriented model, to obtain similar results. Further, references to a function being "called" mean that a thread has caused the function to be executed by control server 350. Further, references to a control object or group representative object executing, performing, or carrying out a function means that a thread has called the function of that particular control object or group representative object.

Figure 6:
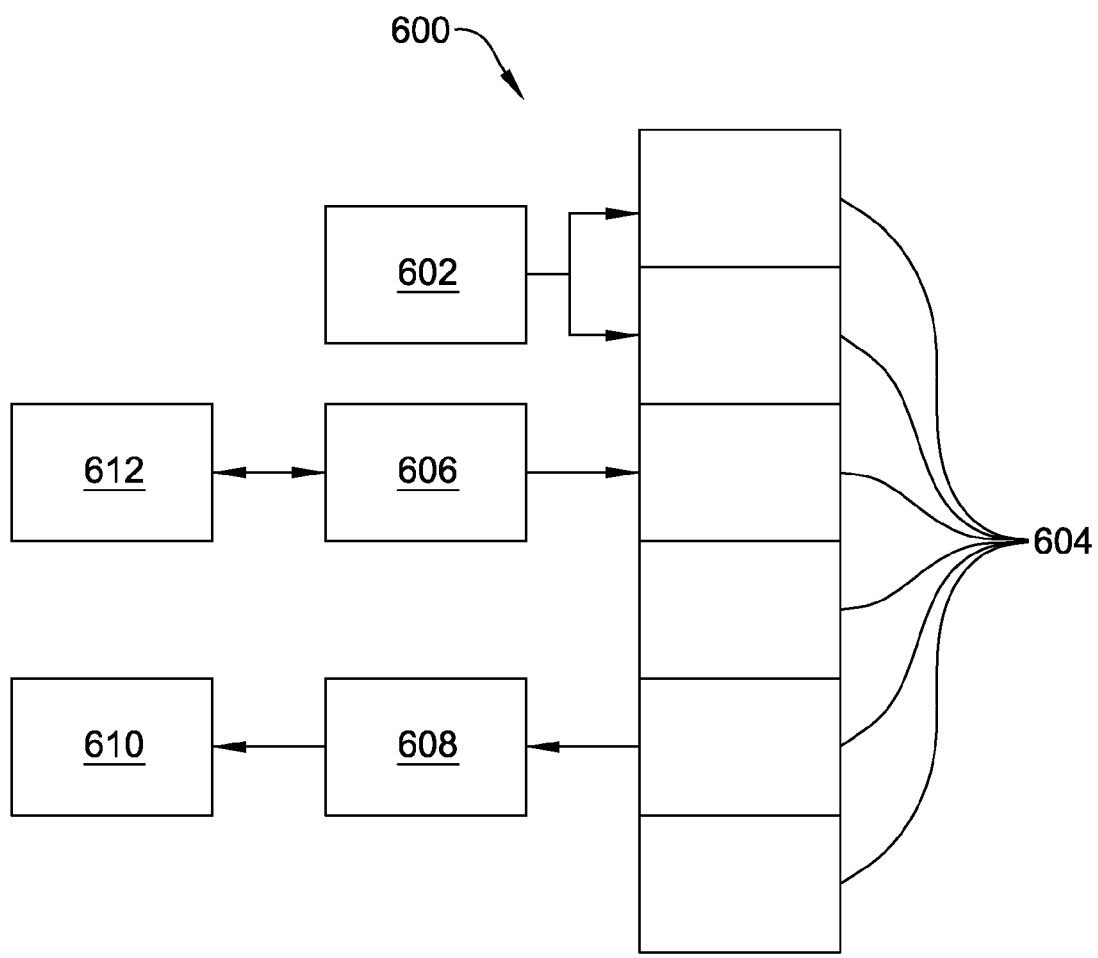

FIG. 6 is a schematic block diagram of a data-logging system 600 in accordance with an exemplary embodiment of the present disclosure. In the exemplary embodiment, data-logging system 600 includes a map-ahead thread 602 configured to acquire blocks of private memory 604 and lock in memory. Data-logging system 600 also includes a master thread 606 configured to write data to the file-mapped blocks of memory, in real-time and in full resolution, the data is acquired during operation of a machine generating the data, the machine including a controller including a processor communicatively coupled to a memory. Data-logging system 600 also includes a write-behind thread 608 configured to copy the stored data from blocks of private memory 604 to file-mapped blocks of memory, thereby writing the data to a storage device 610. In various embodiments, map-ahead thread 602 is configured to acquire and lock, in memory, a selected amount of memory to be maintained in a linked list of unused private memory super pages. In one embodiment, map-ahead thread 602 is configured to automatically select an amount of memory to be maintained in a linked list of unused private memory using a performance measure of the mapping.

Map-ahead thread 602 is configured to acquire new blocks of private memory 604 and lock them in memory when the amount of available unused private blocks is outside a predetermined threshold range. Write-behind thread 608 is configured to acquire file-mapped blocks of memory, copy the content of inactive blocks of private memory 604 to the file-mapped blocks of memory and release the file-mapped blocks of memory after copying the data from the private blocks to the file-mapped blocks.

FIGS. 7A-7E is a file and memory map 700 of data collected by system 400 (shown in FIG. 4). In the example embodiment, operating parameters, interlock states, alarms, and warning information is recorded in real-time from sensors periodically interrogated by the control server in system 400 into a file 702. In various alternative embodiments, the control server also pushes averages of the real-time sampled parameters with much lower time resolution than the real-time sampling rate to a database location. File 702 resides on a hard drive or other storage device operated by the control server in system 400. Data stored in file 702 is written by the operating system for system 400 and is subject to delays inherent in a resource sharing operating system environment. However, to fulfill design requirements for real-time data-logging and real-time historical data retrieval, these delays are not acceptable for meeting performance expectations. Generally, a resolution of the data-logging requires a consistent acquisition and logging of the data. Such consistency is generally not always available in a resource sharing computing environment. Other processes controlled by the operating system request service at unpredictable times, which prevents data acquisition and/or data-logging for a period of time.

In the example embodiment, file 702 includes a plurality of logically sequential pages sized by the operating system and may be limited in overall size based on system 400 storage capabilities. Because the data-logging requirements continue even after file 702 has reached its file size capacity, provisions for controlled overwriting of file 702 are made. In various embodiments, pages 704 are four kilo-bytes (kb) in size.

An area of memory 706 is mapped to the data-logging process. Each page 708 of memory 706 is sized to be twice the size of pages 704 and pages 708 are mapped to a respective two pages 704 of file 702. Additionally, an area of memory 710 that is not mapped to file 702 includes overlapping pages 712. Overlapping means that, for example, data written to the right half of page $P_{i-2}$ is also written to the left half of page $P_{i-1}$ simultaneously. An arrow 714 illustrates a position of an index that tracks the position in memory being written at any given time. In the example embodiment, arrow 714 progresses from left to right to illustrate the operation of the real-time data logging process.

Pages that are shown with no hatching are private memory pages that are inactive, not being written to. Pages that are shown in dotted-hatching are private memory pages that are being written to in real-time by the control server of system 400. Because the pages are not mapped to a file and are locked (not swappable) memory locations, they can be written to in real-time continuously with no delay or interruption. Pages shown in cross-hatching are file-mapped memory pages that are linked to pages in file 702. Arrow 716 illustrates data being copied from an inactive memory page to a memory page that is file-mapped to one or more pages in file 702.

For example, memory pages $P_i$ and $P_{i-1}$ are being written to simultaneously. $P_{i-2}$ is no longer active and is available for data in it to be copied to file-mapped memory page $M_{i-2}$. Copying data from $P_{i-2}$ to $M_{i-2}$ will also involve an immediate update of file pages $B_{i-2}$ and $B_{i-1}$ under control of the operating system of system 400. Because of that, copying data from $P_{i-2}$ to $M_{i-2}$ can be intermittently delayed. This, however, is no problem as long as the copying process is able to maintain an average data transfer rate that is at least equal to the data acquisition rate of the data being written into memory pages $P_i$ and $P_{i-1}$. Typically, current operating systems and hard disks can sustain average transfer rates that are much higher than the real-time data recording rate. However, significant intermittent delays do occur, making direct write to disk pages or to file-mapped memory pages unfit for full resolution real-time data recording.

Headers HP, HM, and H are the first blocks associated with private memory, HP, file-mapped memory, HM, or the file, H. Headers HP, HM, and H contain the current index or location in memory or the file where data is being written to or copied from the associated blocks of memory, private or file-mapped or file. The private memory header block is updated every real-time cycle, and the file-mapped memory header block is updated every time the current file-mapped memory block data block is updated.

FIG. 7B illustrates the data logging process at the end of file 702. When data-logging process nears the end of file 702, the data logging process prepares to cycle from logging data at the end of file 702 to logging data at the front of file 702, overwriting the data that has previously been logged in page $B_1$. Because memory pages 706 and 710 are twice the size of file pages 704, when writing to private memory pages 712 $P_{n-1}$ and $P_n$ that correspond to file page $B_n$, an additional file page, $D_1$ is needed.

FIG. 7C illustrates the data logging process when data is being written to private pages $P_1$ and $P_n$. During this period, data previously written to private memory page $P_{n-2}$ is written to file-mapped memory page $M_{n-2}$, which is linked to file pages $B_{n-2}$ and $B_{n-1}$.

FIG. 7D illustrates the data logging process when data written at the end of file 702 to private memory page $P_n$ is copied to file-mapped memory page $M_n$ and logging has progressed to writing data to pages $P_1$ and $P_2$. Data being written to page $P_1$ corresponds to file pages $B_1$ and $B_2$. However, $B_1$ is the duplicate page $D_1$ that was written at the end of the file. $P_{n-1}$ is copied to $M_{n-1}$. When logging reaches the end of $P_n$, data logging begins writing to pages $P_1$ and $P_2$. When logging to $P_n$ ended, it becomes inactive and will be copied to file-mapped memory page $M_n$. Because page $M_n$ is twice the size of file pages 704, an extra page, page $D_1$ is needed at the end of file 702. File-mapped memory page $M_n$ has to fit in file 702. If page $M_n$ could not fit into file 702, there would be an exception, the operating system would not perform the writing to page $M_n$ because file 702 would not have that much space.

FIG. 7E illustrates the data logging process when index 719 reaches the end of page $P_1$. When index 719 reaches the end of page $P_1$, system 400 then continues to write to page $P_3$ and $P_2$, and page $P_1$ becomes inactive and is ready to be copied to file-mapped memory page $M_1$. Page $P_n$ had already been copied (shown in FIG. 7D) and is reassigned to become page $P_4$ as shown. Private memory page $P_1$ is shown being copied to file-mapped memory page $M_1$, which is mapped to file pages $B_1$ and $B_2$.

As used herein, an element or step recited in the singular and preceded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 505, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is for (a) mapping blocks of private memory to time by numbering the data by time divided by real-time sampling interval, (b) writing data to the mapped blocks of private memory, in real-time and in full resolution, the data being acquired during operation of a machine generating the data, the machine including a controller including a processor communicatively coupled to a memory, (c) copying the stored data from the mapped blocks of private memory to file-mapped memory blocks or directly writing the mapped blocks of private memory to blocks in a file. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays (FPGAs), programmable array logic, programmable logic devices (PLDs) or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The above-described embodiments of a method and system of data-logging provides a cost-effective and reliable means managing a logging process for a large amount of data acquired at relatively short intervals. More specifically, the methods and systems described herein facilitate storing machine state data continuously in real-time and in full resolution. As a result, the methods and systems described herein facilitate maintaining a record of machine operations in a cost-effective and reliable manner.

An exemplary method, system, and apparatus for automatically and continuously logging machine operational data are described above in detail. The apparatus illustrated is not limited to the specific embodiments described herein, but rather, components of each may be utilized independently and separately from other components described herein. Each system component can also be used in combination with other system components.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A data-logging system for writing data to a storage device, the system comprising:
    a map-ahead thread configured to acquire blocks of private memory for storing data to be logged, the blocks of private memory being twice as large as a file page size determined by an operating system of the data-logging system;
    a master thread configured to write data to the blocks of private memory, in real-time and in full resolution, the data acquired during operation of a machine generating the data and written to the blocks of private memory in real-time, the machine including a controller including a processor communicatively coupled to a memory having processor instructions therein; and
    a write-behind thread configured to acquire pages of memory that are mapped to pages in a file, copy the data from the blocks of private memory to the acquired file-mapped blocks of memory, and write the data from one of the blocks of private memory to a plurality of pages of the file on the storage device.

2. The data-logging system of claim 1, wherein the map-ahead thread is configured to automatically select an amount of memory to be maintained in a linked list of unused blocks of private memory using a performance measure of the mapping.

3. The data-logging system of claim 1, wherein the map-ahead thread is configured to write a message to a log file when the amount of file-mapped blocks of memory is outside a predetermined threshold range.

4. The data-logging system of claim 2 wherein the write-behind thread is configured to release the file-mapped blocks of memory and return the just copied private pages to the linked list of unused private memory blocks after copying the data from the blocks of private memory to the file-mapped blocks of memory.

5. The data-logging system of claim 1, wherein the write-behind thread is configured to:
    acquire a file-mapped block of memory;
    copy the content of the private block of memory to the file-mapped block of memory; and
    release the file-mapped block of memory.

6. The data-logging system of claim 1, wherein the write-behind thread is configured to overwrite the oldest data at the beginning of the file with the newest acquired data at the end of the file using a duplicate file-mapped block of memory of the last block in the file.

7. The data-logging system of claim 1, wherein the blocks of private memory are indexed such that the blocks of private memory overlap and wherein acquired data is written into the overlapping blocks of private memory simultaneously.

8. A method of data-logging for writing data to a storage device, said method comprising:
    mapping blocks of private memory to a time index for storing data to be logged in time, the blocks of private memory being twice as large as a page size of the blocks of private memory to which the data will be stored, the blocks of private memory reserved to a data-logging process;
    locking the file-mapped and the private memory pages from page swapping;

writing data to the blocks of private memory, in real-time and in full resolution, the data acquired during operation of a machine generating the data and written to the blocks of private memory in real-time, the machine including a controller including a processor communicatively coupled to a memory having processor instructions therein;

acquiring blocks of memory that are mapped to pages in a file;

copying, by the data-logging process, the data from the blocks of private memory to the acquired file-mapped blocks of memory; and automatically synchronizing the data on the storage device to the contents of the file-mapped blocks of memory by an operating system controlling the operation of the machine.

9. A method in accordance with claim 8, wherein automatically synchronizing the data on the storage device comprises writing, by the operating system of the machine, the data from the blocks of private memory to the storage device.

10. A method in accordance with claim 9, wherein writing the data from the blocks of private memory to a storage device comprises:

acquiring file-mapped blocks of memory; and copying data to the file-mapped blocks of memory from respective blocks of private memory containing data that have been acquired during operation of a machine generating the data, the machine including a controller including a processor communicatively coupled to a memory having instructions for controlling the operation of the processor.

11. A method in accordance with claim 8, wherein mapping blocks of private memory comprises selecting an amount of memory to be maintained in a linked list of unused private memory blocks.

12. A method in accordance with claim 8, wherein mapping blocks of memory comprises automatically selecting an amount of memory blocks to be maintained in a linked list of unused private memory blocks using a performance measure of the mapping.

13. A method in accordance with claim 8, further comprising writing a message to a log file when the amount of mapped blocks of private memory is outside a predetermined threshold range.

14. A method in accordance with claim 8, further comprising unlocking the file-mapped blocks of memory after writing the data read from those blocks to the storage device.

15. One or more non-transitory computer-readable storage media having computer-executable instructions embodied thereon, wherein when executed by at least one processor, the computer-executable instructions cause the processor to:

at a request of a write behind thread, map pages of a file to blocks of memory for storing data to be logged in the file, the mapped blocks of memory sized to be twice the size of native pages of an operating system of the processor;

at the request of a map ahead thread, reserve a plurality of blocks of private memory sized to be twice the size of the native pages and each overlapping with respect to adjacent blocks of private memory;

acquire data from a plurality of sensors during operation of a machine generating the data;

store the acquired data in the blocks of private memory in real-time; and copy the data from the blocks of private memory to the file-mapped blocks of memory.

16. The computer-readable storage media of claim 15, wherein the computer-executable instructions further cause the processor to maintain an index of a current read/write location in the blocks of private memory, the file-mapped blocks of memory, or the file in a respective header block of private memory, header block of file-mapped memory, or file header.

17. The computer-readable storage media of claim 16, wherein the computer-executable instructions further cause the processor to update the header block of private memory every real-time cycle and the header block of file-mapped memory every time the current data block is updated.

18. The computer-readable storage media of claim 16, wherein the computer-executable instructions further cause the processor to overwrite the oldest data at the beginning of the file with the newest acquired data at the end of the file using a duplicate file-mapped block of memory of the last block in the file.

* * * * *